United States Patent
Narula et al.

(10) Patent No.: US 12,501,218 B2
(45) Date of Patent: Dec. 16, 2025

(54) AUDIO PLAYBACK SYNCHRONY FOR INFORMATION HANDLING SYSTEMS

(71) Applicant: Dell Products L.P., Round Rock, TX (US)

(72) Inventors: Harpreet Narula, Austin, TX (US); David Tseng, Spicewood, TX (US)

(73) Assignee: Dell Products L.P., Round Rock, TX (US)

( * ) Notice: Subject to any disclaimer, the term of this patent is extended or adjusted under 35 U.S.C. 154(b) by 297 days.

(21) Appl. No.: 18/067,606

(22) Filed: Dec. 16, 2022

(65) Prior Publication Data
US 2024/0205601 A1 Jun. 20, 2024

(51) Int. Cl.
| | |
|---|---|
| H04R 3/12 | (2006.01) |
| G06F 3/16 | (2006.01) |
| H04L 1/00 | (2006.01) |
| H04L 1/1809 | (2023.01) |
| H04L 1/1829 | (2023.01) |
| H04L 12/18 | (2006.01) |
| H04S 7/00 | (2006.01) |

(52) U.S. Cl.
CPC ............ H04R 3/12 (2013.01); H04S 7/308 (2013.01); *G06F 3/165* (2013.01); *H04L 1/0002* (2013.01); *H04L 1/1809* (2013.01); *H04L 1/1829* (2013.01); *H04L 12/1868* (2013.01); *H04R 2420/07* (2013.01)

(58) Field of Classification Search
CPC ....... H04R 3/12; H04R 2420/07; G06F 3/165; H04L 1/1809; H04L 1/0002; H04L 12/1868; H04L 1/0015; H04L 1/1829
See application file for complete search history.

(56) References Cited

U.S. PATENT DOCUMENTS

| | | | |
|---|---|---|---|
| 11,445,286 B1* | 9/2022 | Rohit Kumar | H04W 4/80 |
| 2006/0067536 A1* | 3/2006 | Culbert | H04S 1/007 |
| | | | 381/103 |
| 2007/0077951 A1* | 4/2007 | Manjeshwar | G04G 7/02 |
| | | | 455/418 |
| 2010/0293286 A1* | 11/2010 | Nikkila | H04W 84/12 |
| | | | 709/233 |

(Continued)

FOREIGN PATENT DOCUMENTS

WO   WO-2022140557 A1 *   6/2022   ............... H04R 3/02

*Primary Examiner* — Carolyn R Edwards
*Assistant Examiner* — Kuassi A Ganmavo
(74) *Attorney, Agent, or Firm* — Norton Rose Fulbright US LLP

(57) ABSTRACT

A first information handling system may detect a second information handling system that supports audio playback synchronization and may determine that the second information handling system is in a same room as the first information handling system. The first information handling system may allocate a first time period for a first acknowledgement to be received from the second information handling system in response to first audio information for a first audio session transmitted by the first information handling system. The first information handling system may transmit the first audio information, receive the first acknowledgement message, and may generate audio for the first audio session using a transducer of the first information handling system based on the first audio information, after receiving the first acknowledgement information.

18 Claims, 14 Drawing Sheets

(56) References Cited

U.S. PATENT DOCUMENTS

| | | | | |
|---|---|---|---|---|
| 2013/0344815 | A1* | 12/2013 | Cahill | H04B 17/27 |
| | | | | 455/67.11 |
| 2014/0079242 | A1* | 3/2014 | Nguyen | H04R 5/00 |
| | | | | 381/86 |
| 2014/0329511 | A1* | 11/2014 | Vesa | H04M 3/569 |
| | | | | 455/416 |
| 2014/0362993 | A1* | 12/2014 | Jung | H04L 9/0861 |
| | | | | 380/270 |
| 2017/0003931 | A1* | 1/2017 | Dvortsov | G11B 27/36 |
| 2017/0347331 | A1* | 11/2017 | Daley | H04H 60/88 |
| 2019/0179597 | A1* | 6/2019 | Tull | H04S 7/301 |
| 2019/0342926 | A1* | 11/2019 | Deng | H04W 84/18 |
| 2020/0022198 | A1* | 1/2020 | James | H04R 1/1091 |
| 2020/0120727 | A1* | 4/2020 | Batta | H04W 76/14 |
| 2020/0374148 | A1* | 11/2020 | Wilberding | G06F 3/017 |
| 2021/0112371 | A1* | 4/2021 | Sholev | H04W 4/029 |
| 2021/0352122 | A1* | 11/2021 | Broberg | H04N 21/43615 |

* cited by examiner

AUDIO PLAYBACK SYNCHRONY FOR INFORMATION HANDLING SYSTEMS

FIELD OF THE DISCLOSURE

The present disclosure generally relates to audio playback on information handling systems, and more particularly relates to synchronous audio playback across multiple collocated information handling systems.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

One use for information handling systems is media playback, such as playback of audio or video content. Information handling systems may include displays, speakers, and other components to facilitate such playback. Users may carry portable information handling systems, such as smart phones, tablets, or laptop computers, with them and may use such information handling systems to listen to music, watch videos, or play games at any location. Such information handling systems may allow users to enjoy audio or video content socially, such as through playback for multiple users in a shared space using a speaker. However, such functionality may be limited due to a lack of interoperability between information handling systems.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

A first information handling system may detect and synchronize with multiple collocated information handling systems, such as information handling systems located in a same room, to provide synchronized audio playback to users of the information handling systems. For example, the first information handling system may detect information handling systems that support audio playback synchronization that are located in a same room as the first information handling system. Broadcasting and acknowledgement of audio information, such as audio packets, between the first information handling systems and other information handling systems may be configured to provide redundancy in cases where audio information is not received and/or acknowledged by one or more of the other information handling systems. Furthermore, delay periods for generation of audio by transducers of synchronized information handling systems may be determined based on audio path delays of the information handling systems to facilitate synchronized audio playback. Thus, a first information handling system, such as a host information handling system, may broadcast audio information to one or more other information handling systems, such as sink information handling systems, and the host and sink information handling systems may engage in a synchronized audio playback session. Such features may enhance a user experience, providing simplified connectivity between collocated information handling systems for audio playback, simplified handover of audio control, enhanced reliability in audio transmission and reception, and an enhanced shared listening experience through synchronization of audio playback.

A first information handling system may detect a second information handling system that supports audio playback synchronization. The first information handling system may determine that the second information handling system is in a same room as the first information handling system. The first information handling system may allocate, based on the determination that the second information handling system is in the same room as the first information handling system, a first time period for a first acknowledgement information to be received from the second information handling system in response to first audio information for a first audio session transmitted by the first information handling system. The first information handling system may receive the first acknowledgement information during the first time period from the second information handling system and may generate audio for the first audio session using a transducer of the first information handling system based on the first audio session, after receiving the first acknowledgement information. Generating the audio for the first audio session may, for example, be synchronized with generation of audio based on the first audio information by the second information handling system, and by other information handling systems connected in the first audio session.

In some embodiments, the first information handling system may allocate a second time period for a second acknowledgement information to be received from a third information handling system in response to the first audio information transmitted by the first information handling system. The first information handling system may determine that the second acknowledgement information is not received from the third information handling system during the second time period and may retransmit the first audio information before generating the audio.

In some embodiments, the first audio information may be transmitted directly to and the first acknowledgement information may be received directly from the second information handling system. For example, a host information handling system may communicate directly with one or more sink information handling systems, such as via a Wi-Fi direct connection, without an intermediary router or other information handling system.

In some embodiments, the first information handling system may determine first and second audio path delays for the first and second information handling systems. The first information handling system may determine a first rendering delay time for the first information handling system based, at least in part, on the first audio path delay and the second audio path delay. Generating the audio may be performed after the first rendering delay time has expired. For example, the first information handling system may determine rendering delays for each information handling system engaged in the first audio session such that the information handling systems engaged in the first audio session are emitting audio in synchrony. Thus, rendering delays for each of the information handling systems may differ based on the properties of audio paths for the respective information handling systems. Use of such delays may allow information handling systems to generate audio in synchrony, accounting for hardware and software differences in audio paths across in different information handling systems.

In some embodiments, the first information handling system may receive input indicating a requested handover of control of the first audio session to the second information handling system. The first information handling system may transmit, to the second information handling system, information indicating the requested handover and may receive, from the second information handling system, a confirmation of the handover. The first information handling system may then transfer control of the first audio session to the second information handling system, such that generation of audio of the first audio session by the second information handling system will continue after the first information handling system terminates a connection between the first information handling system and the second information handling system.

The first information handling system may determine that one or more other information handling systems are in a same room as the first information handling system based one or more measurements. For example, determining that the second information handling system is in the same room as the first information handling system may include generating one or more channel state information (CSI) measurements of one or more channels and determining, based, at least in part, on one or more amplitudes of the one or more CSI measurements, that the second information handling system is in the same room as the first information handling system. Alternatively or additionally, determining that the second information handling system is in the same room as the first information handling system may include generating one or more received signal strength indication (RSSI) measurements and determining, based at least in part, on the one or more RSSI measurements that the second information handling system is in the same room as the first information handling system.

In some embodiments, an information handling system may include a memory and a processor for performing the methods described herein. A computer program product may include a non-transitory computer-readable medium including instructions for causing an information handling system to perform the method described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, determine, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, handheld gaming system, console gaming system, hybrid gaming system, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
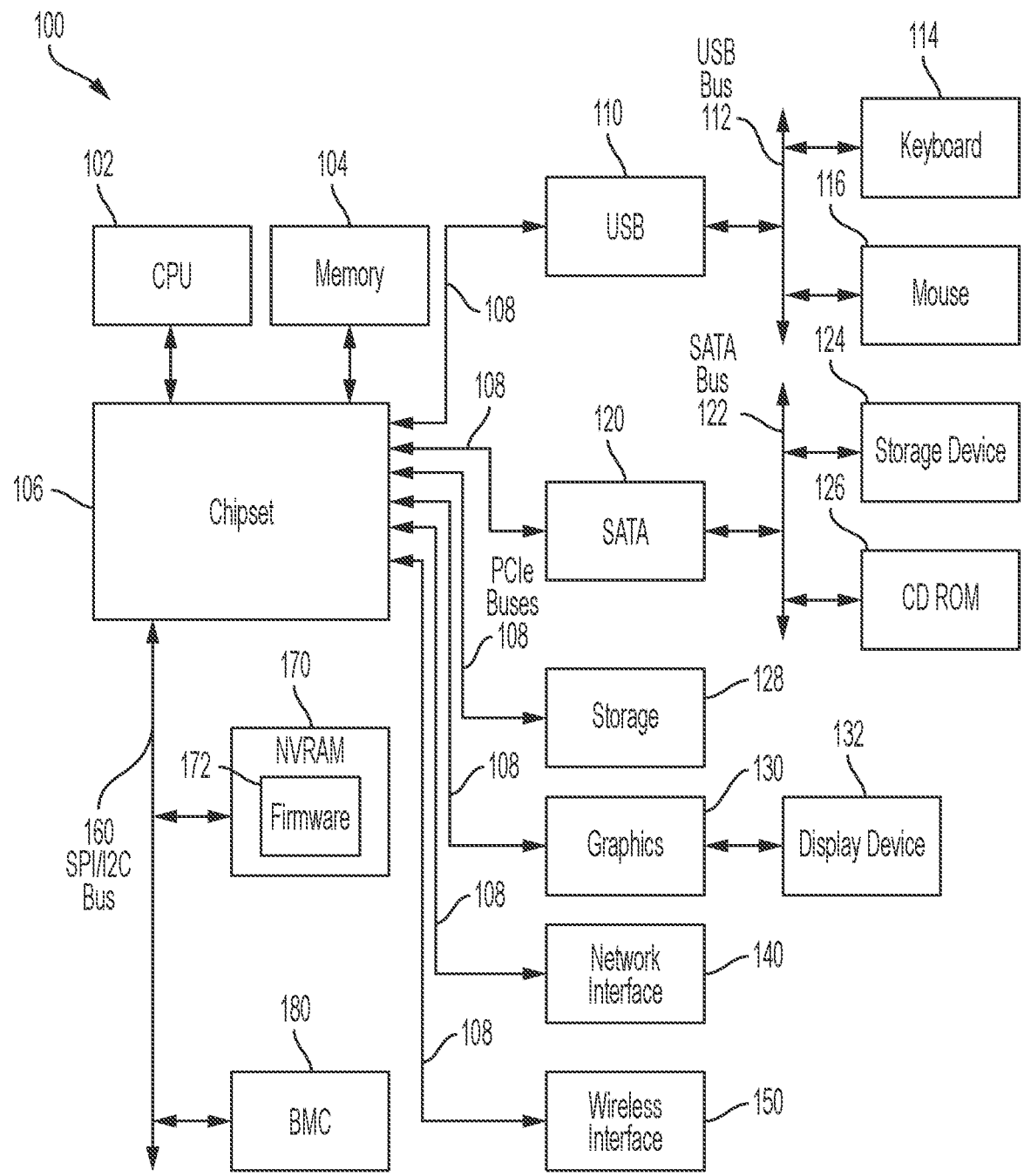
FIG. 1 is a layout of an example information handling system according to some embodiments of the disclosure.

FIG. 1 illustrates an example information handling system 100. Information handling system 100 may include a processor 102 (e.g., a central processing unit (CPU)), a memory (e.g., a dynamic random-access memory (DRAM)) 104, and a chipset 106. In some embodiments, one or more of the processor 102, the memory 104, and the chipset 106 may be included on a motherboard (also referred to as a mainboard), which is a printed circuit board (PCB) with embedded conductors organized as transmission lines between the processor 102, the memory 104, the chipset 106, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 102, the memory 104, the chipset 106, and/or other components may be organized as a System on Chip (SoC).

The processor 102 may execute program code by accessing instructions loaded into memory 104 from a storage device, executing the instructions to operate on data also loaded into memory 104 from a storage device, and generate output data that is stored back into memory 104 or sent to another component. The processor 102 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 102 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 106 may facilitate the transfer of data between the processor 102, the memory 104, and other components. In some embodiments, chipset 106 may include two or more integrated circuits (ICs), such as a northbridge controller coupled to the processor 102, the memory 104, and a southbridge controller, with the southbridge controller coupled to the other components such as USB 110, SATA 120, and PCIe buses 108. The chipset 106 may couple to other components through one or more PCIe buses 108.

Some components may be coupled to one bus line of the PCIe buses 108, whereas some components may be coupled to more than one bus line of the PCIe buses 108. One example component is a universal serial bus (USB) controller 110, which interfaces the chipset 106 to a USB bus 112. A USB bus 112 may couple input/output components such as a keyboard 114 and a mouse 116, but also other components such as USB flash drives, or another information handling system. Another example component is a SATA bus controller 120, which couples the chipset 106 to a SATA bus 122. The SATA bus 122 may facilitate efficient transfer of data between the chipset 106 and components coupled to the chipset 106 and a storage device 124 (e.g., a hard disk drive (HDD) or solid-state disk drive (SDD)) and/or a compact disc read-only memory (CD-ROM) 126. The PCIe bus 108 may also couple the chipset 106 directly to a storage device 128 (e.g., a solid-state disk drive (SDD)). A further example of an example component is a graphics device 130 (e.g., a graphics processing unit (GPU)) for generating output to a display device 132, a network interface controller (NIC) 140, and/or a wireless interface 150 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 106 may also be coupled to a serial peripheral interface (SPI) and/or Inter-Integrated Circuit (I2C) bus 160, which couples the chipset 106 to system management components. For example, a non-volatile random-access memory (NVRAM) 170 for storing firmware 172 may be coupled to the bus 160. As another example, a controller, such as a baseboard management controller (BMC) 180, may be coupled to the chipset 106 through the bus 160. BMC 180 may be referred to as a service processor or embedded controller (EC). Capabilities and functions provided by BMC 180 may vary considerably based on the type of information handling system. For example, the term baseboard management system may be used to describe an embedded processor included at a server, while an embedded controller may be found in a consumer-level device. As disclosed herein, BMC 180 represents a processing device different from processor 102, which provides various management functions for information handling system 100. For example, an embedded controller may be responsible for power management, cooling management, and the like. An embedded controller included at a data storage system may be referred to as a storage enclosure processor or a chassis processor.

System 100 may include additional processors that are configured to provide localized or specific control functions, such as a battery management controller. Bus 160 can include one or more busses, including a Serial Peripheral Interface (SPI) bus, an Inter-Integrated Circuit (I2C) bus, a system management bus (SMBUS), a power management bus (PMBUS), or the like. BMC 180 may be configured to provide out-of-band access to devices at information handling system 100. Out-of-band access in the context of the bus 160 may refer to operations performed prior to execution of firmware 172 by processor 102 to initialize operation of system 100.

Firmware 172 may include instructions executable by processor 102 to initialize and test the hardware components of system 100. For example, the instructions may cause the processor 102 to execute a power-on self-test (POST). The instructions may further cause the processor 102 to load a boot loader or an operating system (OS) from a mass storage device. Firmware 172 additionally may provide an abstraction layer for the hardware, such as a consistent way for application programs and operating systems to interact with the keyboard, display, and other input/output devices. When power is first applied to information handling system 100, the system may begin a sequence of initialization procedures, such as a boot procedure or a secure boot procedure. During the initialization sequence, also referred to as a boot sequence, components of system 100 may be configured and enabled for operation and device drivers may be installed. Device drivers may provide an interface through which other components of the system 100 can communicate with a corresponding device. The firmware 172 may include a basic input-output system (BIOS) and/or include a unified extensible firmware interface (UEFI). Firmware 172 may also include one or more firmware modules of the information handling system. Additionally, configuration settings for the firmware 172 and firmware of the information handling system 100 may be stored in the NVRAM 170. NVRAM 170 may, for example, be a non-volatile firmware memory of the information handling system 100 and may store a firmware memory map namespace 100 of the information handling system. NVRAM 170 may further store one or more container-specific firmware memory map namespaces for one or more containers concurrently executed by the information handling system.

Information handling system 100 may include additional components and additional busses, not shown for clarity. For example, system 100 may include multiple processor cores (either within processor 102 or separately coupled to the chipset 106 or through the PCIe buses 108), audio devices (such as may be coupled to the chipset 106 through one of the PCIe busses 108), or the like. While a particular arrangement of bus technologies and interconnections is illustrated for the purpose of example, one of skill will appreciate that the techniques disclosed herein are applicable to other system architectures. System 100 may include multiple processors and/or redundant bus controllers. In some embodiments, one or more components may be integrated together in an integrated circuit (IC), which is circuitry built on a common substrate. For example, portions of chipset 106 can be integrated within processor 102. Additional components of information handling system 100 may include one or more storage devices that may store machine-executable code, one or more communications ports for communicating with external devices, and various input and output (I/O) devices, such as a keyboard, a mouse, and a video display.

In some embodiments, processor 102 may include multiple processors, such as multiple processing cores for parallel processing by the information handling system 100. For example, the information handling system 100 may include a server comprising multiple processors for parallel processing. In some embodiments, the information handling system 100 may support virtual machine (VM) operation, with multiple virtualized instances of one or more operating systems executed in parallel by the information handling system 100. For example, resources, such as processors or processing cores of the information handling system may be assigned to multiple containerized instances of one or more operating systems of the information handling system 100 executed in parallel. A container may, for example, be a virtual machine executed by the information handling system 100 for execution of an instance of an operating system by the information handling system 100. Thus, for example, multiple users may remotely connect to the information handling system 100, such as in a cloud computing configuration, to utilize resources of the information handling system 100, such as memory, processors, and other hardware, firmware, and software capabilities of the information handling system 100. Parallel execution of multiple containers by the information handling system 100 may allow the information handling system 100 to execute tasks for multiple users in parallel secure virtual environments.

An information handling system may include multiple hardware components, such as SSDs, hard disks, connectivity cards, graphics processing units (GPUs), batteries, field programmable gate arrays (FPGAs), and other hardware components. In some embodiments, an information handling system may include multiple slots for housing hardware components, and in some embodiments, an information handling system may house more than one hundred components. Hardware components of an information handling system may also include a chassis of an information handling system, one or more bays of an information handling system, or one or more slots of an information handling system. Information handling systems may include bays, which may include one or more slots. In some embodiments, different bays, slots located in the different bays, may have different capabilities. For example, some slots of an information handling system or hardware components located in slots of an information handling system may have different form factors, may belong to different storage domains, and may support different technology types. As one example, some slots or hardware components may support series attached small computer system interface (SAS) storage and connectivity and may have a first form factor, while other slots or hardware components may support M.2 storage and connectivity and may have a second, different, form factor. As another example, some bays, and slots located therein, may support CXL, while other bays or slots may not. Enabling or disabling CXL functionality in a bay that supports CXL may, in table-based GUIs, require navigation through a complex series of prompts and menus. In some cases, information handling systems may have multiple hardware components, such as slots, labeled with a same number, such as 0 or 1, and hardware components sharing a same number may even be located on a same visual plane. As another example, backplanes of an information handling system may include bays that have 40, 24, 8, 4 or another number of slots. Some information handling systems may not include physical dividers, such as sheet metal dividers, indicating where one bay, with slots having a first set of capabilities, ends and another bay, with slots having a second set of capabilities, begins. Some information handling systems may support enterprise and data center solid state drive form factor (EDSFF), and may include hardware components with a same or similar form factor, but different functions, such as dynamic random access memory (DRAM) hardware components, FPGA hardware components, general purpose GPU (GPGPU) hardware components, and other hardware components. Furthermore, slots and bays that house EDSFF hardware components may be updated over time, such as through firmware updates, and may thus have different capabilities depending on an update status of each individual slot or bay. Viewing a physical front of an information handling system may not provide sufficient information to a user of the information handling system regarding hardware component status or functionality. For example, viewing a physical front of an information handling system may not allow a user to determine capabilities or firmware update status of bays or slots of an information handling system. Furthermore, packaging of an information handling system may not provide up to date information regarding capabilities of bays or slots of the information handling system due to firmware updates performed after printing of the packaging. As another example, viewing a physical information handling system, packaging, or user interface may not provide a user with information regarding whether a backplane or one or more bays of the information handling system supports one or more upgrades, such as an upgrade to a faster bus speed (e.g., an upgrade from SAS to nonvolatile memory express (NVMe)).

Figure 2A:
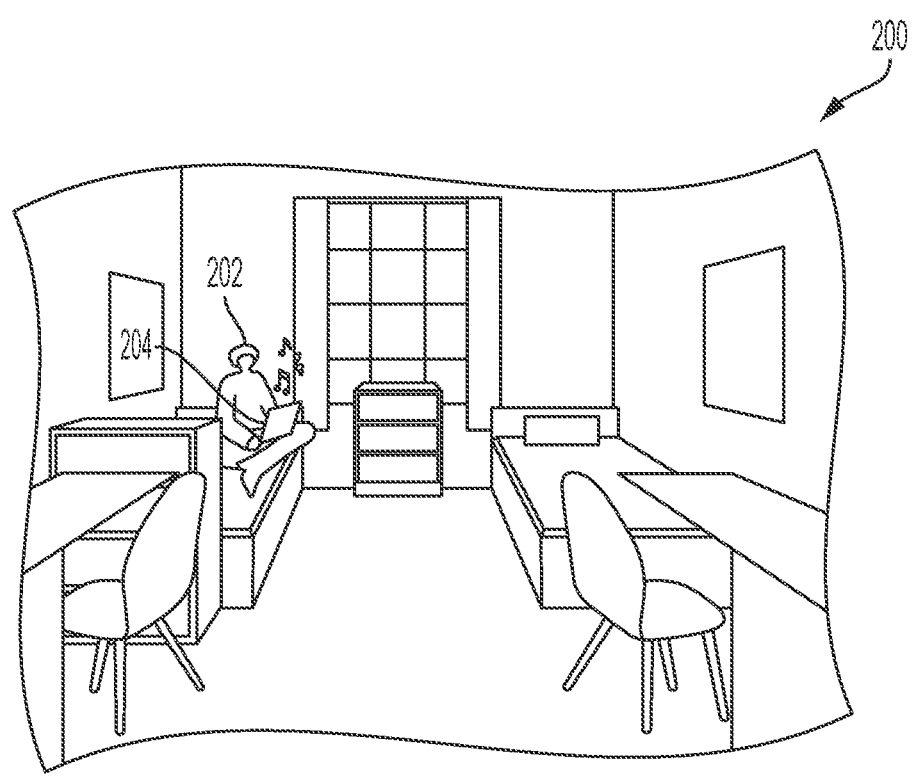
FIG. 2A is an example environment for audio synchronization by a first information handling system, according to some embodiments of the disclosure.
Figure 2B:
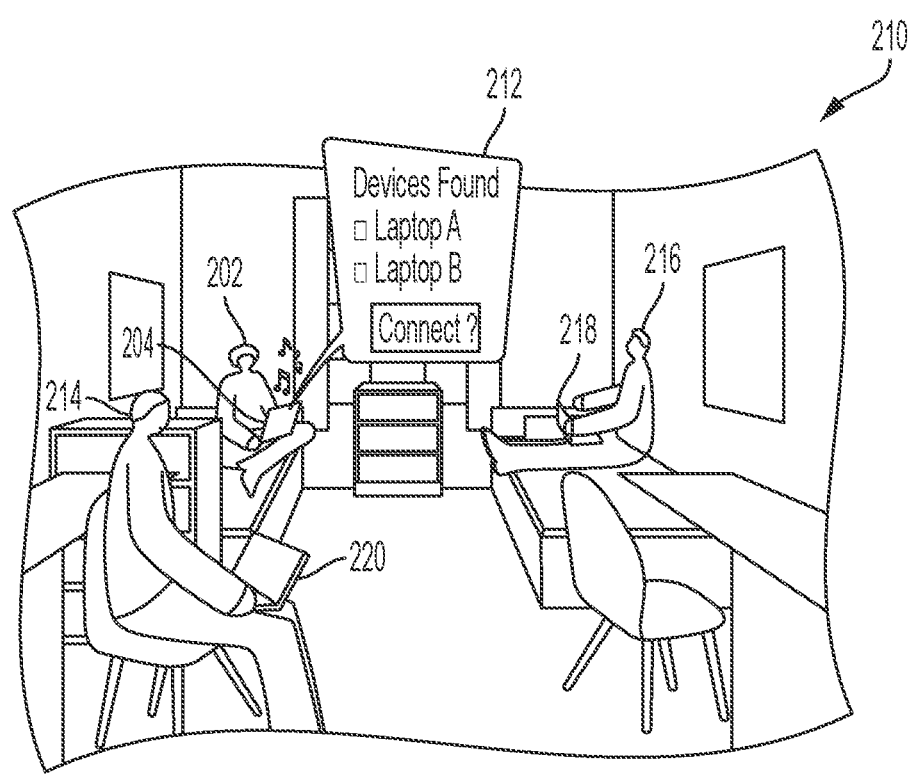
FIG. 2B is an example environment for audio synchronization by a first information handling system, according to some embodiments of the disclosure.

Multiple users of information handling systems that support audio synchronization may engage in a shared audio playback session in a same room. An example environment 200 for synchronized audio playback is shown in FIG. 2A. A first user 202 may use a first information handling system 204 to playback audio, such as using one or more speakers or transducers of the first information handling system 204. In FIG. 2B, a second user 206 of a second information handling system 218 and a third user 214 of a third information handling system 220 may join the first user 202 in the environment 210. In some embodiments, more than or fewer than two additional users of two additional information handling systems may join the first user 202 in the environment 210. The first information handling system 204, second information handling system 218, and third information handling system 220 may support synchronized audio playback. The first information handling system 212 may detect the second information handling system 218 and the third information handling system 220, such as through a Wi-Fi Direct or other detection procedure, and may display a prompt 212 to the user 202 of the first information handling system 204 indicating whether the user wishes to connect to the second information handling system 218 and the third information handling system 220 for a synchronized audio session. In some embodiments, the first information handling system 204 may determine that the second information handling system 218 and the third information handling system 220 support synchronized audio playback and are in a same room as the first information handling system 204 and may display the prompt 212 based on such determinations. In some embodiments, 212, the first information handling system 204 may indicate only other information handling systems that are determined to be in a same room as the first information handling system 204 and that are determined to support synchronized audio playback in the prompt 212 to avoid presenting the user 202 with information handling systems that do not support synchronized audio playback and/or are not located in a same room as the first information handling system 204.

Figure 2C:
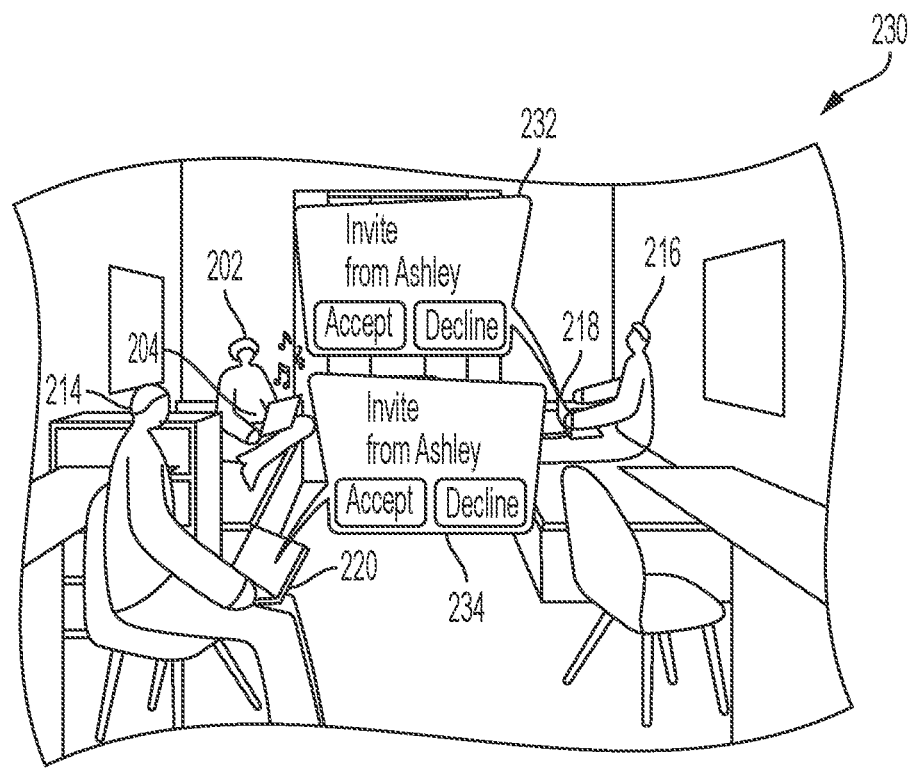
FIG. 2C is an example environment for audio synchronization by a first information handling system, according to some embodiments of the disclosure.

In the environment 230 of FIG. 2C, the first user 202 may select an option to connect to the second information handling system 218 and the third information handling system 220 for a synchronized audio playback session. Prompts 232, 234 may be displayed for user 216 on information handling system 218 and for user 214 on information handling system 220 requesting permission from the users to begin a synchronized audio playback session.

Figure 2D:
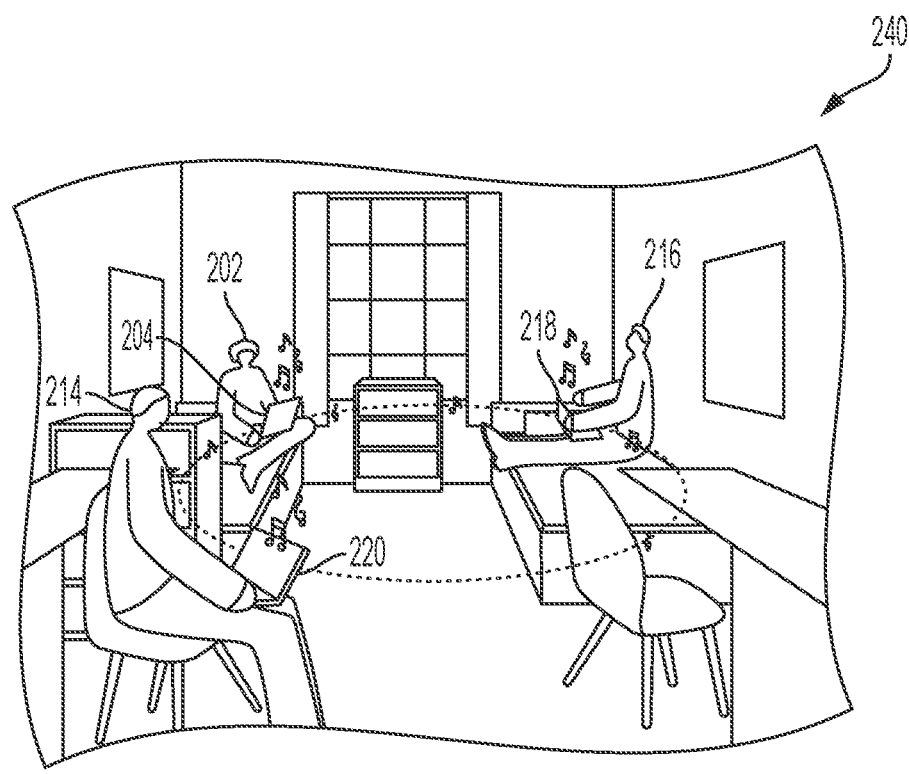
FIG. 2D is an example environment for audio synchronization by a first information handling system, according to some embodiments of the disclosure.

When second user 216 and third user 214 approve the synchronized audio playback session, the synchronized audio playback session may begin, as shown in environment 240 of FIG. 2D. For example, first information handling system 204, second information handling system 218, and third information handling system 220 may engage in synchronized playback of audio controlled by first information handling system 204 through speakers of the information handling systems 204, 218, and 220. For example, the first information handling system 204 may broadcast packets of audio information, and the second information handling system 218 and third information handling system 220 may receive the broadcast packets. In some embodiments, the packets may be broadcast directly from the first information handling system 204 to the second information handling system 218 and third information handling system 220, such as through a Wi-Fi Direct connection. In some embodiments, the first information handling system 204 may also control timing of generation of audio based on the transmitted audio information, such as by establishing rendering delay times for the first, second, and third information handling systems 204, 218, 220 based on audio path characteristics of each information handling system and/or other audio characteristics of the information handling systems. Use of such delay times may allow music to be played in synchrony on each of the information handling systems 204, 218, and 220 by adjusting generation of audio such that the audio from the information handling systems 204, 218, and 220 reaches users 202, 216, and 214 at substantially the same time.

Figure 2E:
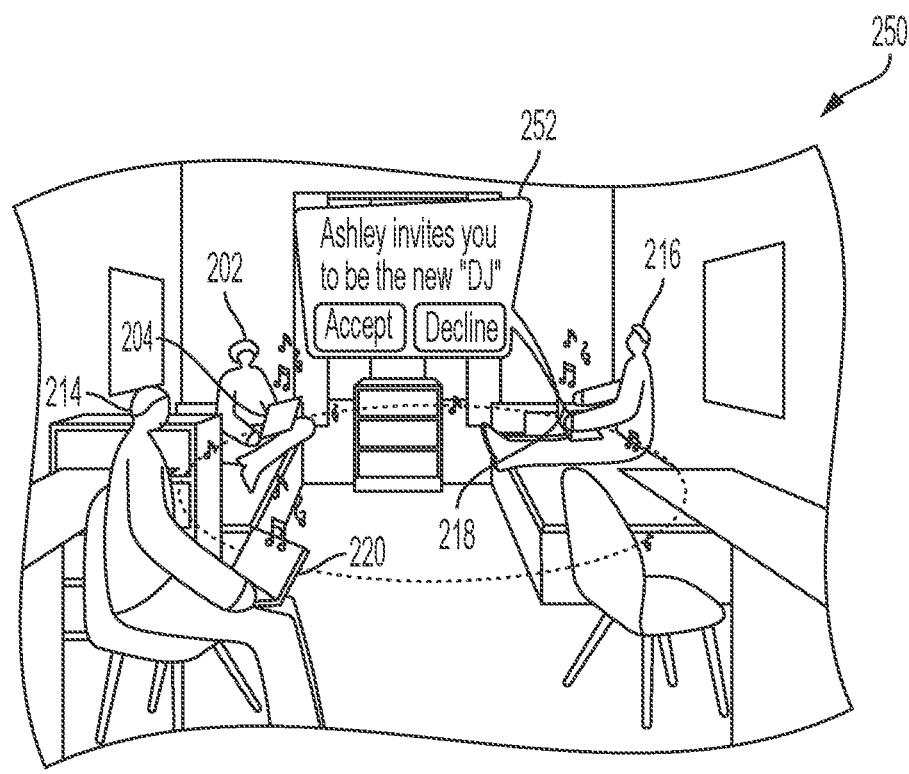
FIG. 2E is an example environment for audio synchronization by a first information handling system, according to some embodiments of the disclosure.
Figure 2F:
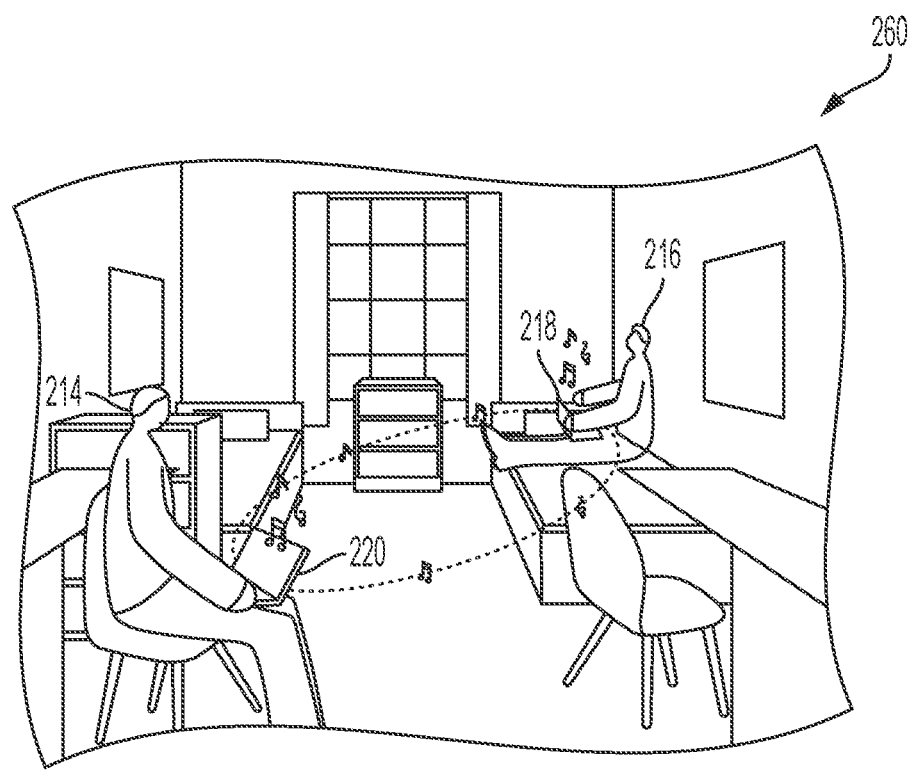
FIG. 2F is an example environment for audio synchronization by a first information handling system, according to some embodiments of the disclosure.

A user may transfer control of an audio session to another participant of the audio session so that playback of audio may be maintained even in the absence of the user that initiated and/or is currently controlling the synchronized audio session, such as when the user wishes to leave the room. Such a transfer of control is shown in environment 250 of FIG. 2E. A user 202 controlling the audio session via information handling system 204 may select an option to transfer control to one of the information handling systems participating in the audio session, such as second information handling system 218. When the first user 202 selects an option to transfer control, a prompt 252 may be displayed on a display of second information handling system 218 asking the second user 216 whether they wish to assume control of the synchronized audio session. If the second user accepts the transfer of control, the second information handling system 218 may begin broadcasting audio information packets to the first information handling system 204 and the third information handling system 220. Then, when the first user 202 and/or the first information handling system 204 leave the room, as shown in the environment 260 of FIG. 2F, the audio session may continue seamlessly without interruption of audio production. For example, the second information handling system 218 may continue broadcasting audio information packets, the third information handling system 220 may continue receiving the broadcasted audio information packets, and the second and third information handling systems 218, 220 may continue to playback audio of the synchronized audio playback session.

Figure 3:
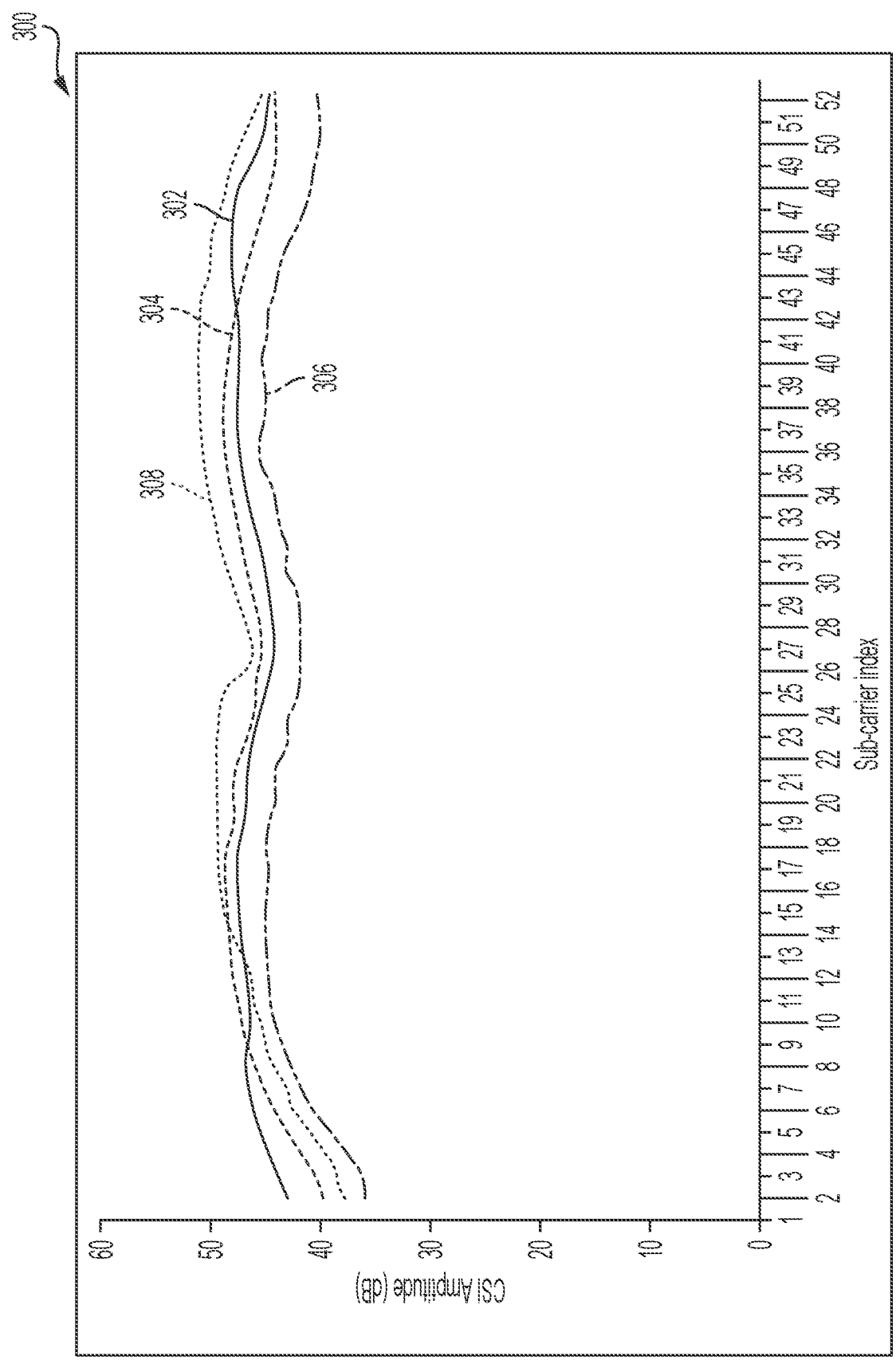
FIG. 3 is an example plot of CSI amplitude measurements for different subcarriers for multiple channels according to some embodiments of the disclosure.
Figure 4:
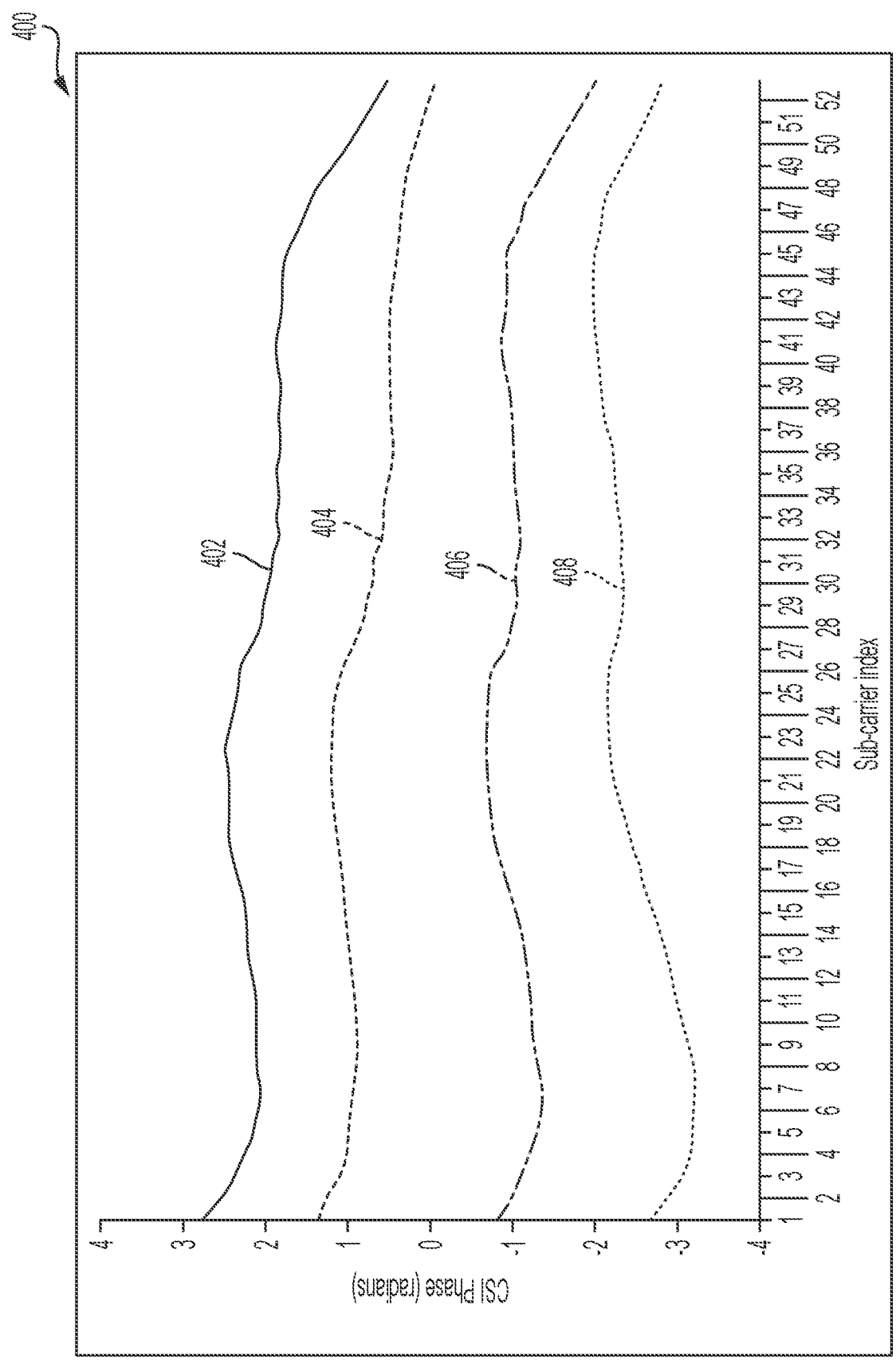
FIG. 4 is an example plot of CSI phase measurements for different subcarriers for multiple channels according to some embodiments of the disclosure.

To detect whether sink information handling systems for a potential synchronized audio playback session are in a same room as the host information handling system, the host information handling system may perform one or more measurements of one or more signals from the one or more sink information handling systems. In some embodiments, such sensing may include sensing of Wi-Fi signals from the sink information handling systems, such as using a Wi-Fi direct connection over a 5 GHz or 6 GHz band with the sink information handling systems. In some embodiments, the host information handling system may generate one or more received signal strength indication (RSSI) measurements of signals from the sink information handling systems to determine whether the sink information handling systems are within a predetermined distance of the host information handling system. Sink information handling systems that are not within the predetermined distance of the host information handling system may not be displayed as candidates for a synchronized audio playback session. Additionally, channel state information (CSI) measurements of channel transmissions from the sink information handling systems may be used to determine if the sink information handling systems are within a same room as the host information handling system and to determine whether users are present at the sink information handling systems. An example plot 300 of CSI amplitude measurements against subcarrier indices is shown in FIG. 3. For example, orthogonal frequency division multiple access (OFDMA) is introduced in 802.11ax and enables reliable broadband communication by reducing inter-symbol interference, thus enabling longer symbol durations. In OFDMA, subcarriers are spaced further apart in frequency to position time-domain waveforms of the sub-carriers as orthogonal to one another. Such positioning allows for use of fast Fourier transforms (FFTs) instead of complex banks of oscillators and demodulators for individual subcarrier transmission. Some devices may also support multiple-input multiple-output (MIMO) OFDM transmission, which may enable multiple data channels using orthogonal signals. Some devices may support transmission and measurement of CSI for channel state estimation to increase channel capacity. CSI includes information regarding amplitude and phase of each subcarrier used by a device. In a stable state, an amplitude and phase of CSI transmissions may stay stable across all channels. For example, in a system using four channels, plots of CSI amplitude for the first channel 302, the second channel 304, the third channel 306, and the fourth channel 308 may be stable across all subcarriers. Thus, a stable plot of CSI amplitude as shown in FIG. 3 may indicate that a sink information handling system is in a stable position relative to a host information handling system. Likewise, in the plot 400 of CSI phase measurements cross multiple subcarriers shown in FIG. 4, CSI phase for a first channel 402, second channel 404, third channel 406, and fourth channel 408 may be relatively constant across the subcarriers. Thus, a stable plot of CSI phase as shown in FIG. 4 may indicate that a sink information handling system is in a stable position relative to a host information handling system. Likewise, a plot with large variation in CSI amplitude and/or phase may indicate that a sink information handling system is being moved or that one or more users are moving about the room, causing a signal path between the host information handling system and one or more sink information handling systems to change. Such changes may, for example, be detected by performing a FFT on waveforms, such as those shown in FIGS. 3 and 4, to detect motion either of the information handling systems themselves or of objects, such as users, around the information handling systems. Furthermore, a strength of CSI amplitude measurements for CSI from one or more sink information handling systems may be used to determine whether sink information handling systems are in a same room as host information handling systems. For example, an amplitude of CSI may be lower for sink information handling systems that are not in a same room as a host information handling system than for sink information handling systems that are in the same room as the host information handling system due to interference in signal transmission caused by walls of a room. Thus, a host information handling system may determine whether sink information handling systems are in a same room as the host information handling system and whether users are present at the sink information handling systems based on signal measurements, such as RSSI measurements and/or CSI measurements.

Figure 5:
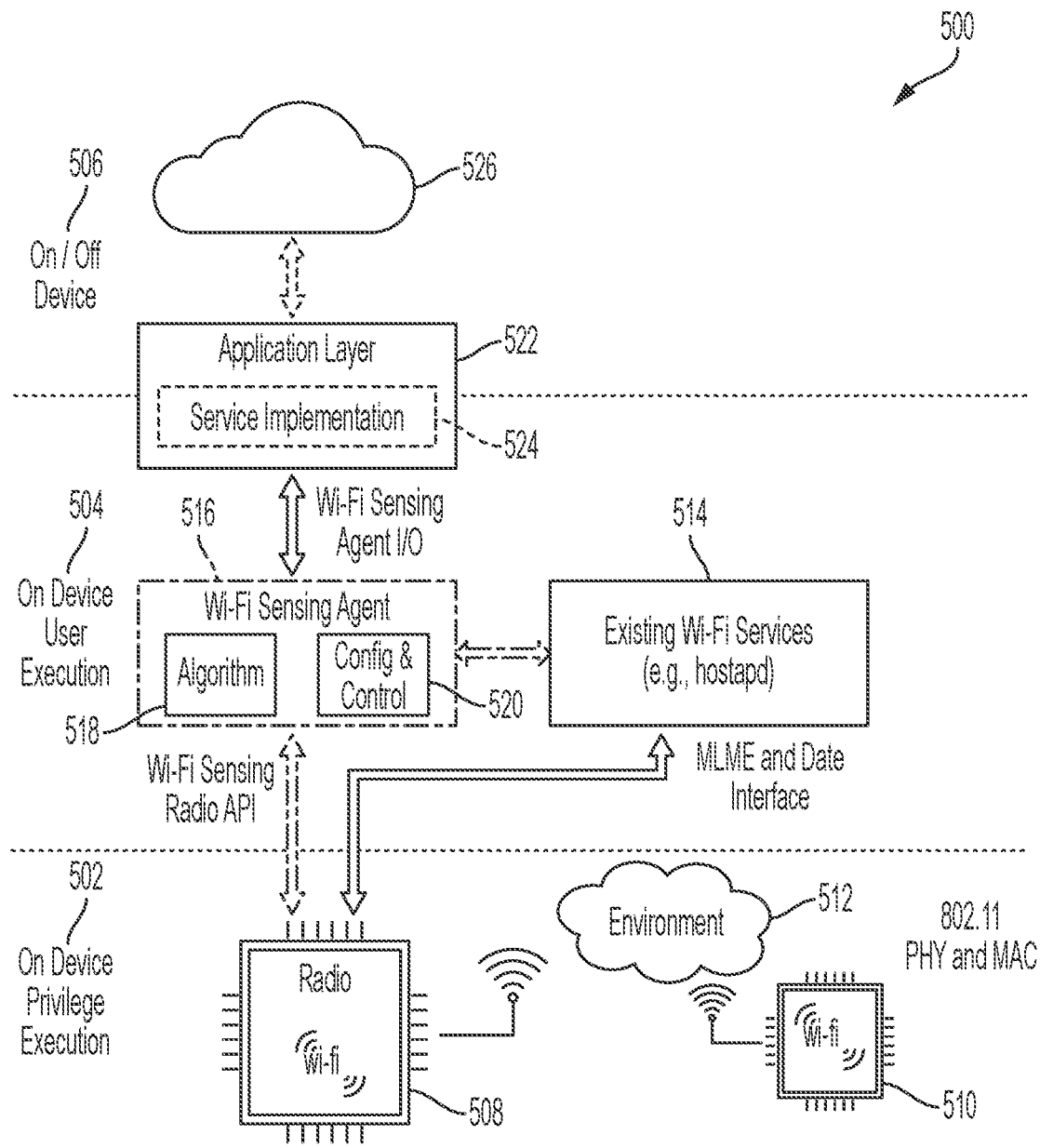
FIG. 5 is a block diagram of an example information handling system configured for a synchronized audio session according to some embodiments of the disclosure.

An example system 500 for synchronized audio playback sessions is shown in FIG. 5 and may be integrated into an information handling system in whole or in part. Functionality may be divided into on device privilege execution functionality 502, on device user execution functionality 504, and on/off device functionality 506. The on device privilege execution functionality may include an 802.11 physical (PHY) and media access control (MAC) layer Wi-Fi modules 508, 510. The Wi-Fi modules 508, 510 may, for example, be used to sense an environment 512, such as to generate one or more CSI measurements and/or RSSI measurements for one or more sink information handling systems. The system 500 may further include a Wi-Fi sensing agent 516. The Wi-Fi sensing agent 516 may communicate with the Wi-Fi modules 508, 510 via a Wi-Fi sensing radio application programming interface (API). The Wi-Fi sensing agent may include one or more algorithms 518 for processing of sensed Wi-Fi information, such as sensed RSSI information and/or sensed CSI, and configuration and control data 520 for storing configurations of the Wi-Fi sensing agent 516. The system 500 may further include other existing Wi-Fi services, such as hostapd, and may communicate with the Wi-Fi modules 508, 510 via media access control (MAC) layer management entity (MLME) and data interfaces. The system 500 may include an application layer 522 that may be executed on the host information handling system and/or in the cloud. The application layer 522 may include a service implementation 524 for presenting information to users and/or allowing users to configure and engage in synchronized audio playback sessions. The application layer 522 may further communicate with cloud-based services 526, such as music streaming and/or data storage services.

Figure 6:
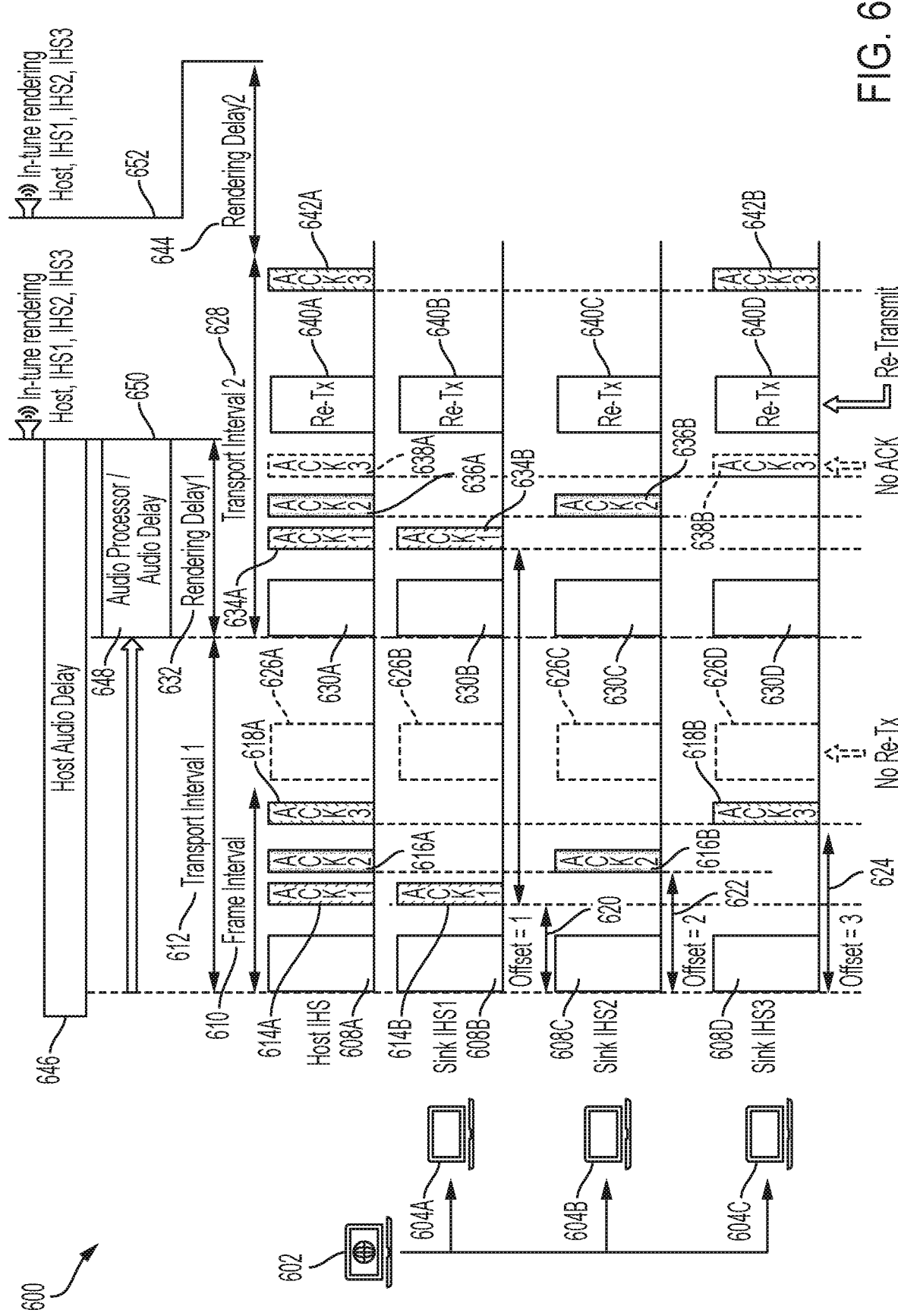
FIG. 6 is an example timing diagram for transmission of audio reception to a plurality of sink information handling systems and reception of acknowledgements from the plurality of sink information handling systems according to some embodiments of the disclosure.

An example timeline 600 for synchronized audio playback is shown in FIG. 6. A host information handling system 602 may determine to engage in a synchronized audio playback session with a first sink information handling system 604A, a second sink information handling system 604B, and a third sink information handling system 604C. The host information handling system 602 may broadcast a first audio information packet at 608A, which may be received by first, second, and third sink information handling systems at 608B, 608C, and 608D, respectively. The first sink information handling system 604A may be configured, by the host information handling system 602 to transmit acknowledgements to audio packets at a first offset 620 from receipt of the audio packets and may thus transmit a first acknowledgement 614B, which may be received by the host information handling system 602 at 614A. Likewise, the second sink information handling system 604B may be configured, by the host information handling system 602 to transmit acknowledgements to audio packets at a second offset 622 from receipt of the audio packets and may thus transmit a second acknowledgement 616B, which may be received by the host information handling system 602 at 616A. The third sink information handling system 604C may be configured, by the host information handling system 602 to transmit acknowledgements to audio packets at a third offset 624 from receipt of the audio packets and may thus transmit a second acknowledgement 618B, which may be received by the host information handling system 602 at 618A. Thus, the host information handling system 602 may configure cach of the client information handling systems 604A-C to transmit acknowledgements at different times within a frame interval 610 to confirm receipt of the transmitted audio packet 608A. If the audio packet is acknowledged by all of the sink information handling systems participating in the synchronized audio playback session, the host information handling system 602 may refrain from retransmission of the audio packet at 626A, and the sink information handling systems may not receive the audio packet at 626B-D. A transport interval 612 may include sufficient time for an initial transmission of an audio packet, receipt of acknowledgements from each sink information handling system to the initial transmission of the audio packet, one retransmission of the audio packet, and receipt of acknowledgements from each sink information handling system to the retransmission of the audio packet.

When the host information handling system 602 does not receive an acknowledgement of a transmitted audio packet from one or more sink information handling systems, the host information handling system 602 may retransmit the audio packet. For example, a second audio packet 630A may be transmitted and received by sink information handling systems 604A-C at 630B-D. A first acknowledgement 634B may be transmitted by the first sink information handling system 604A and may be received by the host information handling system 602 at 634A, and a second acknowledgement 636B may be transmitted by the second sink information handling system 604B and may be received by the host information handling system 602 at 636A. The third sink information handling system 604C may, however fail to transmit an acknowledgement at 638B. For example, the third sink information handling system 604C may fail to receive the audio packet at 630D and may thus not transmit an acknowledgement to the audio packet. When the host information handling system does not receive an acknowledgement at 638A, the host information handling system may retransmit the audio packet at 640A. The first and second sink information handling systems 604A-B may ignore the retransmitted audio packet at 640B and 640C, while the third sink information handling system may receive the retransmitted audio packet at 640D. The third sink information handling system may then transmit an acknowledgement to the retransmission 624B and the host information handling system 602 may receive the acknowledgement at 642A. A second transport interval 628 for transmission of the second audio packet may be equal in length to the first transport interval 612. In some embodiments, an audio packet, also referred to as a frame, may only be retransmitted once and may not be retransmitted outside of the transport interval 612.

A host audio delay period 604 may be a period of delay for the host information handling system from receipt or accessing of an audio packet by the host information handling system 602 to generation of audio at 650 using the audio packet. For example, to synchronize audio playback between the host information handling system 602 and the sink information handling systems 604A-B the host information handling system may wait a period of time at least equal to a transport interval 612 for transmission of an audio packet to sink information handling systems and an audio processor/audio delay period 648 such that the host information handling system 602 and the client information handling systems 604A-C generate audio at a same time in synchrony. The audio processor/audio delay period 648 may, for example, be determined based on an audio path delay of the host information handling system and cach of the sink information handling systems. The audio path delay time 648 may also be referred to as a rendering delay time 632 and may, for example, be determined based on results of an audio digital signal processor loop-back test performed on each of the host information handling system 602 and the client information handling systems 604A-C. In some embodiments, the audio processor/audio delay time 648 may be the same for each of the host information handling system 602 and the client information handling systems. In some embodiments, the audio processor/audio delay time 648 may be individualized for the host information handling system 602 and each of the client information handling systems 604A-C based on loop back test results and audio digital signal processor characteristics for each of the information handling systems. Thus, a first rendering delay period 632 and a second rendering delay period 644 may be equal to each other and may facilitate synchronous audio playback by the host information handling system 602 and the client information handling systems at playback occasions 650, 652.

Figure 7A:
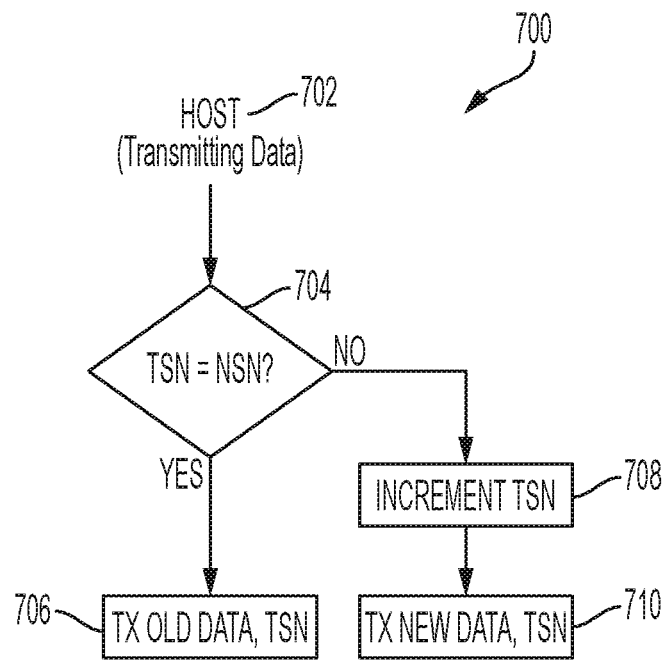
FIG. 7A is a flow chart of an example method for tracking audio information transmission and acknowledgement according to some embodiments of the disclosure.
Figure 7B:
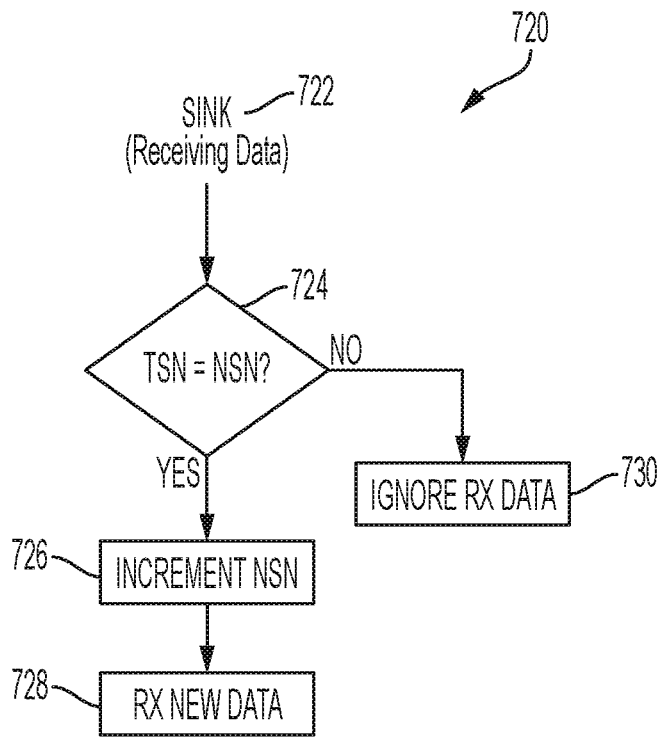
FIG. 7B is a flow chart of an example method for tracking audio information transmission and acknowledgement according to some embodiments of the disclosure.

An example tracking procedure 700 by a host information handling system 702 for confirmation of audio packet acknowledgement is shown in FIG. 7A. For example, a two bit serial number may be included in an audio packet or frame, referred to as a transmit serial number, to identify the packet. Such a serial number may, for example, be added to a vendor defined information element section of a Wi-Fi Direct frame. A serial number included in an acknowledgement transmitted by a sink information handling system and stored by the sink information handling system may be referred to as a next serial number (NSN), while a serial number stored at a host information handling system and transmitted in audio packets by the host information handling system may be referred to as a transmit serial number (TSN). When a host information handling system receives an acknowledgement, the host information handling system may, at 704 compare the NSN included in the acknowledgement with a stored TSN, identifying the packet that the host information handling system sent previously. If the TSN is equal to the NSN the host information handling system may, at 706, retransmit an audio packet, as an NSN equal to a stored TSN indicates that the sink information handling system did not receive the most recently transmitted audio packet. If the TSN is not equal to the NSN, the host information handling system may, at 708, increment the stored TSN. In some embodiments, the host information handling system may only increment the stored TSN when NSNs different from the TSN have been received from all sink information handling systems participating in a synchronized audio playback session. In some embodiments, the host information handling system may also increment the stored TSN, even if an NSN equal to a stored TSN has been received, such as when an audio packet has already been retransmitted at least once. A 710, the host information handling system may transmit a new audio packet including the incremented TSN. Likewise, as shown in process 720 of FIG. 7B, a sink information handling system 722 may, at 722 compare a TSN of a received audio packet with a stored NSN. If the TSN is not equal to the stored NSN, the host information handling system may, at 730, ignore the received audio packet, as the unequal values of the TSN and NSN may indicate that the audio packet is a retransmission of an audio packet that was already received by the sink information handling system. If the TSN of the received audio packet is equal to the stored NSN, the sink information handling system may, at 726, increment a stored NSN value. The sink information handling system may then, at 728, receive and process the new audio packet. Thus, receipt of audio packets may be tracked using two bit serial numbers included in audio packets and acknowledgements.

Figure 8:
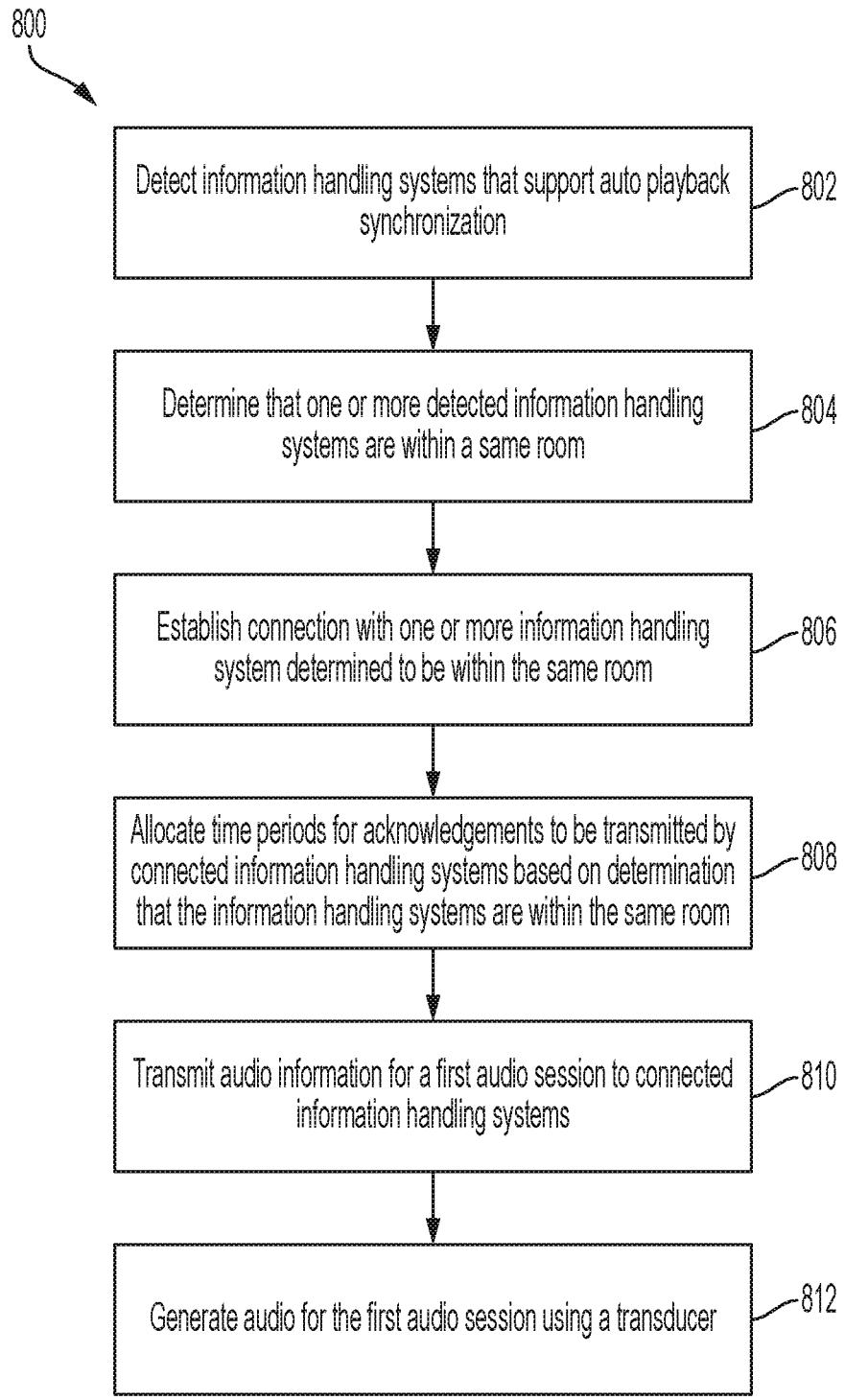
FIG. 8 is a flow chart of an example method for synchronized audio playback according to some embodiments of the disclosure.

An example method 800 for synchronized audio playback is shown in FIG. 8 and may be performed by a host information handling system. The method 800 may begin, at block 802, with detection of information handling systems that support audio playback synchronization. Such detection may be performed by detecting information handling systems that include software capable of supporting synchronized audio playback. In some embodiments, detection of information handling systems may include discovering one or more potential sink information handling systems in wireless communication range of a host information handling system, such as using Wi-Fi device discovery procedures, Bluetooth device discovery procedures, ultra-wideband (UWB) device discovery procedures, and other discovery procedures. In some embodiments, identities of detected information handling systems may be determined based on device names. Such names may also be used to filter devices, so that a device is only displayed to a user as a potential sink information handling system one time even if the device is detected using multiple detection technologies. In some embodiments, the host information handling system may detect all information handling systems within a range that support audio playback, such as two, three, or more client information handling systems.

At block 804, the host information handling system may determine that one or more detected information handling systems are in a same room as the host information handling system. For example, the host information the host information handling system generate CSI measurements for each of multiple potential sink information handling systems and/or may generate one or more RSSI measurements for each of multiple potential sink information handling systems. Based on generated measurements, the host information handling system may determine whether the one or more potential sink information handling systems are located in a same room. In some embodiments, the host information handling system may determine that two or more detected information handling systems are in a same room as the host information handling system.

At block 806, the host information handling system may establish a connection with one or more sink information handling systems determined to be in a same room. For example, the host information handling system may filter detected information handling systems at blocks 802 and 804 to determine potential sink information handling systems that support synchronized audio playback and are located in a same room as the host information handling system. The host information handling system may then automatically connect to the determined potential sink information handling systems or may present a user with a list of determined potential sink information handling systems for selection. If the host information handling system presents a user with a list of potential sink information handling systems, the host information handling system may establish a connection with only the potential sink information handling systems that are selected by the user. The connection may, for example, be a direct connection, such as a Wi-Fi direct connection. Establishing a connection may, for example, include performing a connection establishment procedure, a Wi-Fi association or reassociation procedure and may include allocation of time periods as described with respect to block 808.

At block 808, the host information handling system may allocate time periods for acknowledgements to be transmitted by connected information handling systems based on the determination that the information handling systems are within the same room. For example, the host information handling system may establish a connection with only sink information handling systems that are determined to be a same room and may allocate time periods for transmission of acknowledgments to audio information transmission to the connected sink information handling systems. In some embodiments, such time periods may, for example, include lengths of time between transmission and/or receipt of audio information and a scheduled time for transmission of acknowledgements to the audio information. In some embodiments, such time periods may be interleaved, such that each sink information handling system connected to the host information handling system for a synchronized audio playback session is allocated a specific time period for transmission of acknowledgments. Such allocation may, for example, be referred to as network latency configuration. In some embodiments, such time periods may be allocated using an intelligent scheduler to deterministically manage the latency of the music data transmission. For example, the host information handling system may establish a broadcast session, such as a Wi-Fi direct broadcast session, for audio information to be broadcast by the host information handling system and received by each client information handling system at a same time. Time periods may be allocated using a target wake time of the client information handling systems to define different time delays for acknowledgement transmission after packets are received. For example, a vendor defined information element may be used as part of a Wi-Fi or other association or re-association procedure or during a session setup process to inform sink information handling systems of their allocated time periods for acknowledgment transmission.

At block 810, the host information handling system may transmit audio information for an audio session to the connected sink information handling systems. For example, the host information handling system may broadcast audio information directly to the sink information handling systems. In some embodiments, the host information handling system may restrict communication with a Wi-Fi router by the host information handling system and/or one or more sink information handling systems using target wake time configuration to prevent collisions between information handling system communication with the router and communication between the host information handling system and the sink information handling systems.

At block 812, the host information handling system may generate audio for the first audio session using a transducer of the host information handling system. The audio may, for example, be generated in synchrony with generation of audio by the sink information handling systems to produce a synchronized audio playback session. For example, the host information handling system may generate audio based on the audio data at a same time as one or more sink information handling systems. The audio may be generated after receiving a first acknowledgement. In some embodiments, the host information handling system may wait a period of time before generating the audio using the audio information based on an audio generation delay period as described with respect to FIG. 10.

Figure 9:
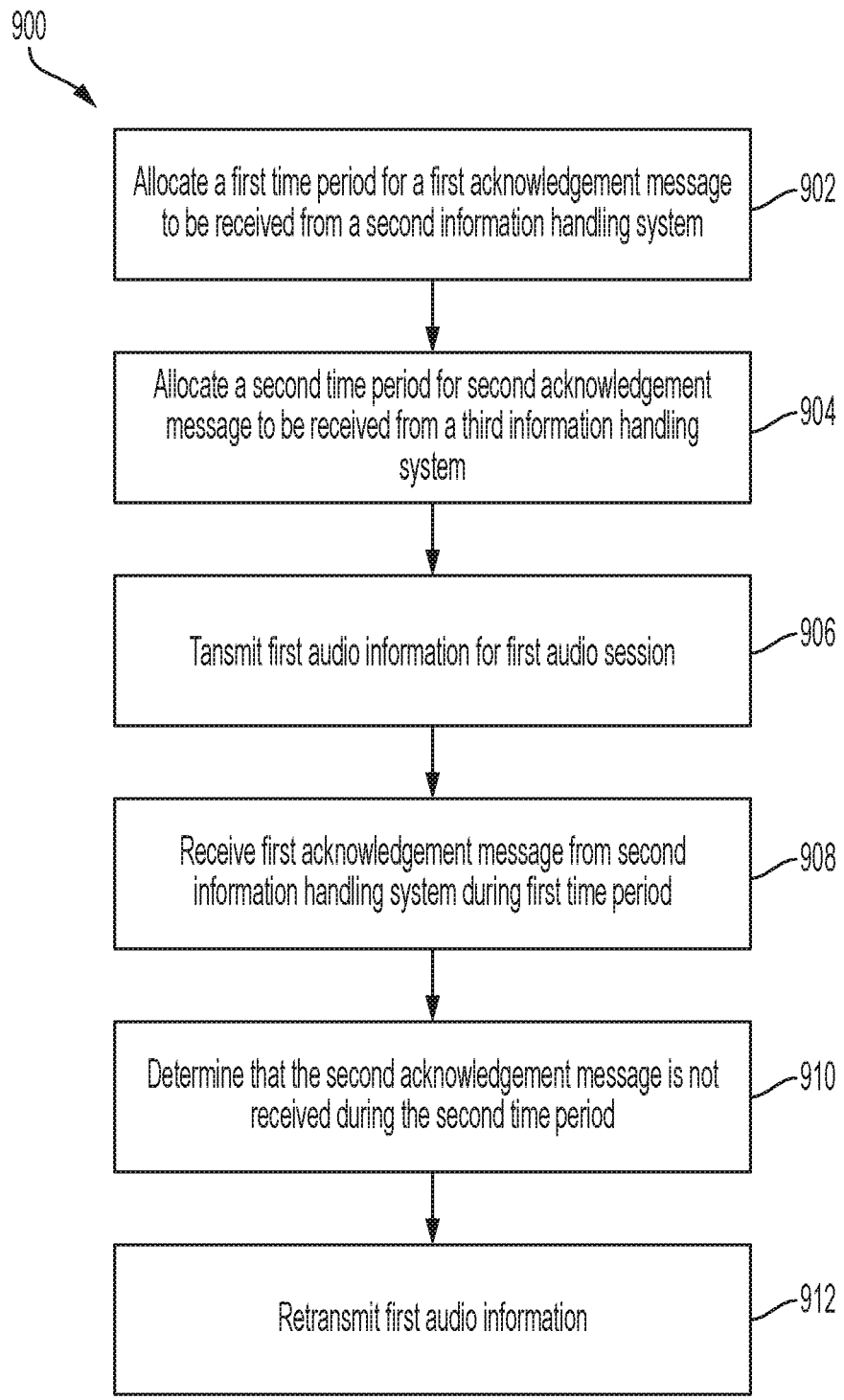
FIG. 9 is a flow chart of an example method for audio information reception acknowledgement for synchronized audio playback according to some embodiments of the disclosure.

In some embodiments, a host information handling system may retransmit audio information when acknowledgements are not received from one or more sink information handling systems in response to transmission of audio information. An example method 900 for processing audio acknowledgements is shown in FIG. 9. The method 900 may, for example, be performed in combination with one or more steps of the method 800 of FIG. 8. The method 900 may begin, at block 902, with allocating a first time period for a first acknowledgement message to be received from a second information handling system, such as a sink information handling system. Such a time period may be allocated as described with respect to block 808 of FIG. 8. At block 904, the host information handling system may allocate a second time period for a second acknowledgement message to be received from a third information handling system, such as a sink information handling system. Such a time period may also be allocated as described with respect to block 808 of FIG. 8. The second time period may be different from the first time period such that the first and second time periods are interleaved. The time periods may be allocated to the second and third information handling systems by transmitting indications of the first time period and the second time period during a connection establishment procedure.

At block 906, the host information handling system may transmit first audio information for a first audio session to the second and third information handling systems. Such transmission may, for example, include broadcasting audio information to the second and third information handling systems. At block 908, the host information handling system may receive a first acknowledgement message from the second information handling system. For example, the second information handling system may receive the audio information transmitted at block 906 and may transmit an acknowledgement to the host information handling system.

At block 910, the host information handling system may determine that a second acknowledgement is not received from the third information handling system during the second time period. For example, the third information handling system may fail to receive the first audio information and may thus fail to transmit an acknowledgement during the allocated second time period. At block 912, the host information handling system may retransmit the first audio information based on the lack of an acknowledgement received during the second time period. In some embodiments, the host information handling system may broadcast the first audio information to retransmit the first audio information, and the second information handling system, which already received and acknowledged the first audio information, may ignore the retransmission of the first audio information. The host information handling system may then determine whether an acknowledgement to the retransmitted audio information is received from the third information handling system during the respective allocated time period. In some embodiments, the host information handling system may define a time out period, such that only a number of retransmissions of audio information is limited. For example, after one retransmission of audio information, the host information handling system may transmit new audio information instead of continuing to retransmit the unacknowledged audio information.

Figure 10:
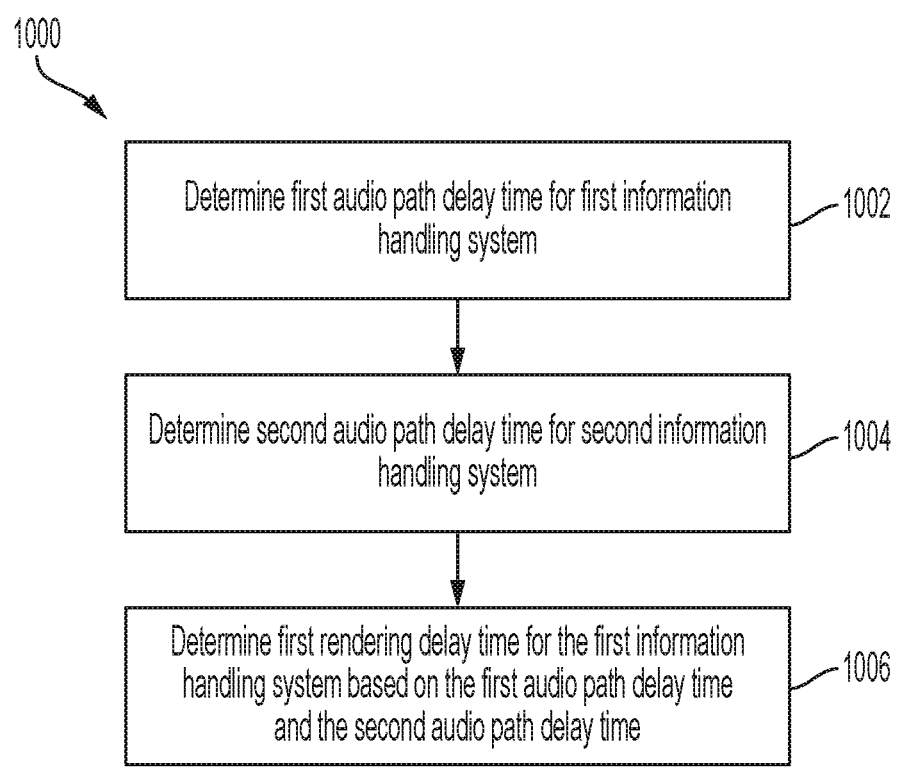
FIG. 10 is a flow chart of an example method for determination of a rendering delay time for a first information handling system according to some embodiments of the disclosure.

In some embodiments, a host information handling system may configure audio rendering delay times for the host information handling system and sink information handling systems to facilitate audio synchronization. For example, different information handling systems may be located in different locations and/or may have different hardware for generation of audio. The different hardware for generation of audio and different locations may produce different delay times in audio reaching one or more users. Thus, the host information handling system may configure one or more delay times for audio generation by the host information handling system and sink information handling systems to provide in-tune audio rendering and synchronization. Such in-tune rendering may align music packets at an output of a digital signal processor, accounting for audio path delays of different information handling systems engaged in the synchronized audio playback session. A method 1000 for determination of a rendering delay time is shown in FIG. 10 and may be performed along with one or more steps of FIGS. 8 and 9. The method may begin, at block 1002 with determining a first audio path delay time for a first information handling system, such as the host information handling system. The method may further include, at block 1004, determining a second audio path delay time for a second information handling system, such as a sink information handling system. Determination of audio path delay times may be made by performing audio path loop back tests of one or more audio tones on the respective information handling systems. For example, the first information handling system may generate one or more tones with one or more transducers and may instruct one or more sink information handling systems, such as the second information handling system, to also generate one or more tones with one or more transducers. The first information handling system may measure the timing of the generated tones and may determine an audio path delay time for the first information handling system and for the second information handling system based on the measured timing.

At block 1006, the first information handling system may determine a first rendering delay time for the first information handling system based on the first audio path delay time and the second audio path delay time. In some embodiments, the first information handling system may determine audio path delay times for sink information handling systems, such as the second information handling system. In some embodiments, a determined audio path delay time may be the same for a host information handling system and one or more sink information handling systems, while in other embodiments a determined audio path time may be different for each information handling system participating in a synchronized audio playback session. In some embodiments, an audio clock for generation of audio may be synchronized with a Wi-Fi clock, and the determined rendering delay time may be added to digital signal processor processing to achieve audio synchronization among multiple information handling systems. In some embodiments, audio path delay times may be stored in a memory of a host information handling system, and such stored times may be used to determine one or more rendering delay times. For example, audio path delay times may be established during a design phase and assigned to specific builds of information handling systems to enhance audio synchronization.

Figure 11:
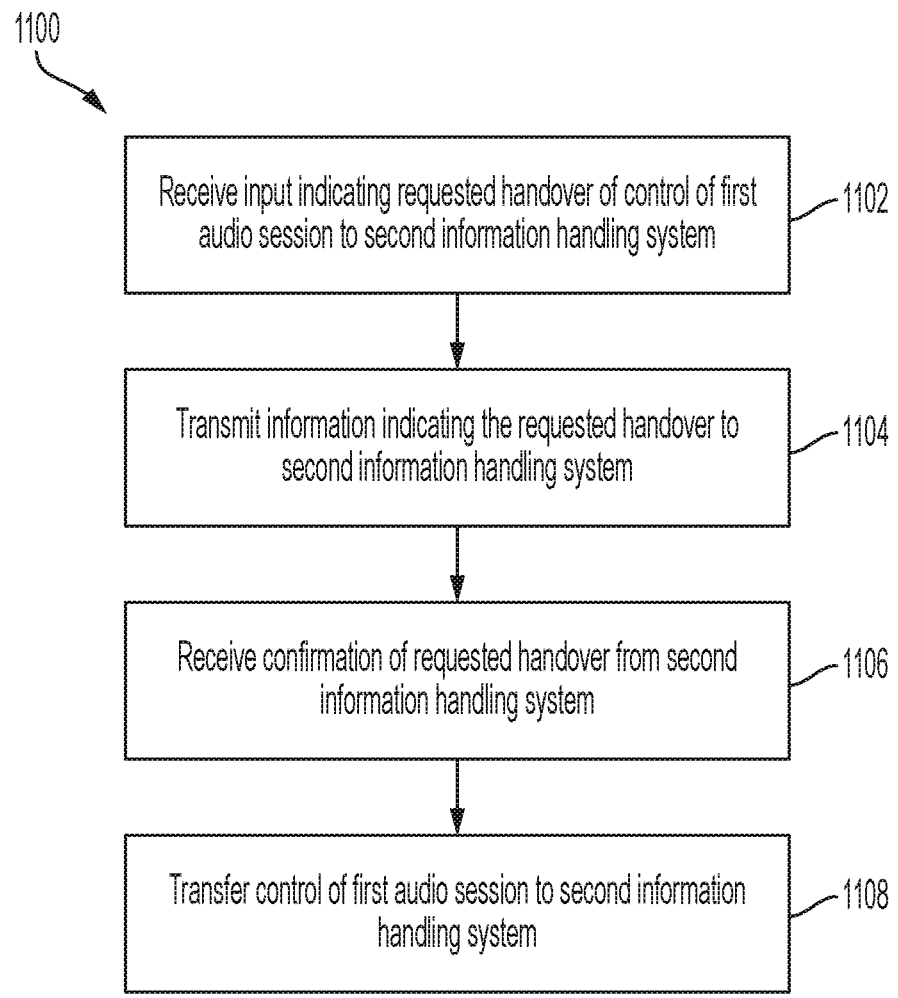
FIG. 11 is a flow chart of an example method for synchronized audio session control handover according to some embodiments of the disclosure.

In some embodiments, a host information handling system may handover control of a synchronized audio playback session to a sink information handling system, and the sink information handling system may assume the role of host information handling system. An example method 1100 for handover of control of a synchronized audio playback session is shown in FIG. 11 and may be performed along with one or more steps of the methods of FIGS. 8-10. The method 1100 may begin, at block 1102, with receiving input indicating requested handover of control of a first audio session to a second information handling system. For example, when a user of a first information handling system, such as a host information handling system wishes to leave a room, but other users of other information handling systems wish to continue an audio playback session, the user of the host information handling system may select a sink information handling system to which the user wishes to transfer control.

At block 1104, the first information handling system may transmit information indicating the requested handover to the second information handling system. For example, the second information handling system may receive the information and may display a prompt for the user of the second information handling system inquiring whether the user of the second information handling system wishes to assume control of the audio playback session. The first information handling system may, at block 1106 receive confirmation of the requested handover from the second information handling system, such as when a user of the second information handling system provides input to the second information handling system to accept the requested handover.

At block 1108, the first information handling system may transfer control of the first audio session to the second information handling system. The second information handling system may begin to broadcast audio information for the first audio session to the first information handling system and other sink information handling systems that are participating in the first audio session. Thus, when the first information handling system is removed from a room in which the information handling systems are located, the audio playback session may continue seamlessly on information handling systems remaining in the room.

The flow chart diagrams of FIGS. 8-11 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method audio playback by a first information handling system, comprising:
   detecting a second information handling system that supports audio playback synchronization;
   determining that the second information handling system is in a same room as the first information handling system, wherein determining that the second information handling system is in the same room as the first information handling system comprises performing a fast Fourier transform (FFT) analysis on one or more channel state information (CSI) waveforms, transmitted by the second information handling system, to generate one or more CSI measurements comprising amplitude and phase values;

allocating, based on the determination that the second information handling system is in the same room as the first information handling system, a first time period for a first acknowledgement information to be received from the second information handling system in response to first audio information for a first audio session transmitted by the first information handling system;

transmitting the first audio information for the first audio session to the second information handling system;

receiving the first acknowledgement information during the first time period from the second information handling system; and generating audio for the first audio session using a transducer of the first information handling system based on the first audio information, after receiving the first acknowledgement information.

2. The method of claim 1, wherein generating the audio for the first audio session by the first information handling system is synchronized with generation of audio based on the first audio information by the second information handling system.

3. The method of claim 1, further comprising:
allocating a second time period for a second acknowledgement information to be received from a third information handling system in response to the first audio information transmitted by the first information handling system;
determining that the second acknowledgement information is not received from the third information handling system during the second time period; and
retransmitting the first audio information before generating the audio.

4. The method of claim 1, wherein the first audio information is transmitted directly to and the first acknowledgement information is received directly from the second information handling system, and wherein allocating the first time period comprises transmitting an indication of the first time period during a connection establishment procedure.

5. The method of claim 1, further comprising:
determining a first audio path delay time for the first information handling system;
determining a second audio path delay time for the second information handling system; and
determining a first rendering delay time for the first information handling system based, at least in part, on the first audio path delay and the second audio path delay, wherein generating the audio using the transducer is performed after the first rendering delay time has expired.

6. The method of claim 1, further comprising:
receiving input indicating a requested handover of control of the first audio session to the second information handling system;
transmitting, to the second information handling system, information indicating the requested handover;
receiving, from the second information handling system, a confirmation of the handover; and
transferring control of the first audio session to the second information handling system, such that generation of audio of the first audio session by the second information handling system will continue after the first information handling system terminates a connection between the first information handling system and the second information handling system.

7. The method of claim 1, wherein determining that the second information handling system is in the same room as the first information handling system comprises:
generating one or more received signal strength indication (RSSI) measurements; and
determining, based at least in part, on the one or more RSSI measurements that the second information handling system is in the same room as the first information handling system.

8. A first information handling system, comprising:
a memory; and
at least one processor coupled to the memory, wherein the at least one processor is configured to:
detect a second information handling system that supports audio playback synchronization;
determine that the second information handling system is in a same room as the first information handling system, wherein determining that the second information handling system is in the same room as the first information handling system comprises performing a fast Fourier transform (FFT) analysis on one or more channel state information (CSI) waveforms, transmitted by the second information handling system, to generate one or more CSI measurements comprising amplitude and phase values;
allocate, based on the determination that the second information handling system is in the same room as the first information handling system, a first time period for a first acknowledgement information to be received from the second information handling system in response to first audio information for a first audio session transmitted by the first information handling system;
transmit the first audio information for the first audio session to the second information handling system;
receive the first acknowledgement information during the first time period from the second information handling system; and
generate audio for the first audio session using a transducer of the first information handling system based on the first audio information, after receiving the first acknowledgement information.

9. The first information handling system of claim 8, wherein generation of the audio for the first audio session by the first information handling system is synchronized with generation of audio based on the first audio information by the second information handling system.

10. The first information handling system of claim 8, wherein the at least one processor is further configured to:
allocate a second time period for a second acknowledgement information to be received from a third information handling system in response to the first audio information transmitted by the first information handling system;
determine that the second acknowledgement information is not received from the third information handling system during the second time period; and
retransmit the first audio information before generating the audio.

11. The first information handling system of claim 8, wherein the first audio information is transmitted directly to and the first acknowledgement information is received directly from the second information handling system, and wherein the at least one processor is configured to allocate of the first time period by transmitting an indication of the first time period during a connection establishment procedure.

12. The first information handling system of claim 8, wherein the at least one processor is further configured to:
   determine a first audio path delay time for the first information handling system;
   determine a second audio path delay time for the second information handling system; and
   determine a first rendering delay time for the first information handling system based, at least in part, on the first audio path delay and the second audio path delay, wherein the at least one processor is configured to generate the audio using the transducer after the first rendering delay time has expired.

13. The first information handling system of claim 8, wherein the at least one processor is further configured to:
   receive input indicating a requested handover of control of the first audio session to the second information handling system;
   transmit, to the second information handling system, information indicating the requested handover;
   receive, from the second information handling system, a confirmation of the handover; and
   transfer control of the first audio session to the second information handling system, such that generation of audio of the first audio session by the second information handling system will continue after the first information handling system terminates a connection between the first information handling system and the second information handling system.

14. The first information handling system of claim 1, wherein to determine that the second information handling system is in the same room as the first information handling system, the at least one processor is configured to:
   generate one or more received signal strength indication (RSSI) measurements; and
   determine, based at least in part, on the one or more RSSI measurements that the second information handling system is in the same room as the first information handling system.

15. A non-transitory computer readable medium comprising instructions for causing a first information handling system to perform steps-comprising:
   detecting a second information handling system that supports audio playback synchronization;
   determining that the second information handling system is in a same room as the first information handling system, wherein determining that the second information handling system is in the same room as the first information handling system comprises performing a fast Fourier transform (FFT) analysis on one or more channel state information (CSI) waveforms, transmitted by the second information handling system, to generate one or more CSI measurements comprising amplitude and phase values;
   allocating, based on the determination that the second information handling system is in the same room as the first information handling system, a first time period for a first acknowledgement information to be received from the second information handling system in response to first audio information for a first audio session transmitted by the first information handling system;
   transmitting the first audio information for the first audio session to the second information handling system;
   receiving the first acknowledgement information during the first time period from the second information handling system; and
   generating audio for the first audio session using a transducer of the first information handling system based on the first audio information, after receiving the first acknowledgement information.

16. The non-transitory computer readable medium of claim 15, wherein generating the audio for the first audio session by the first information handling system is synchronized with generation of audio based on the first audio information by the second information handling system.

17. The non-transitory computer readable medium of claim 15, wherein the non-transitory computer readable medium further comprises instructions for causing the first information handling system to perform steps comprising:
   allocating a second time period for a second acknowledgement information to be received from a third information handling system in response to the first audio information transmitted by the first information handling system;
   determining that the second acknowledgement information is not received from the third information handling system during the second time period; and
   retransmitting the first audio information before generating the audio.

18. The non-transitory computer readable medium of claim 15, wherein the first audio information is transmitted directly to and the first acknowledgement information is received directly from the second information handling system, and wherein allocating the first time period comprises transmitting an indication of the first time period during a connection establishment procedure.

* * * * *